United States Patent Office 2,742,494
Patented Apr. 17, 1956

2,742,494

MIXED ESTERS OF PHTHALIC ACIDS AND PROCESS FOR PRODUCTION THEREOF

Richard G. Mraz, Wilmington, Del., assignor to Hercules Powder Company, Wilmington, Del., a corporation of Delaware No Drawing. Application September 26, 1952, Serial No. 311,795

4 Claims. (Cl. 260—475)

This invention relates to novel mixed esters of a phthalic acid selected from the group consisting of terephthalic acid and isophthalic acid.

In accordance with the present invention, there has been discovered a procedure for making mixed esters of phthalic acids which is particularly useful for the production of mixed esters of terephthalic acid and mixed esters of isophthalic acid, although it is also useful for the production of mixed esters of o-phthalic acid. In a broad aspect, the process comprises converting a monoalkyl ester of a phthalic acid to a mixed ester of a phthalic acid by reacting said monoester with a dihydric alcohol or an alkylene oxide and recovering the mixed ester of a phthalic acid from the reaction mixture. The monoalkyl esters of a phthalic acid, which serve as starting materials in the invention, are compounds well known to the art and are described, for instance, in U. S. 2,479,066 to William F. Gresham and in Ber. 37, 3222 (1904); Ber. 40, 1968 (1907); Ber. 43, 3477 (1910); and Ann. 245, 142.

The conversion of the monoester of a phthalic acid to a mixed ester may be accomplished in two ways. The first involves esterifying the monoester with a dihydric alcohol of the formula HO(CH$_2$)$_n$OH, where $n$ is an integer from 2 to 10. The conditions under which this esterification is carried out are rather critical, since it is necessary to employ conditions whereby the rate of esterification is high as compared with the rate of alcoholysis. In general, a temperature of from 100° to 185° C. may be employed effectively with a temperature of from 105° to 125° C. being preferred. At temperatures much above 185° C. the rate of alcoholysis of the monoester is quite high—so high, in fact, that only small amounts of the desired mixed ester are found in the esterification product, and it is very difficult to isolate the small amounts of mixed esters from the alcoholysis products. The temperature employed should, of course, be high enough to melt the monoester. While it is possible to carry out the esterification without the use of a catalyst, it is much preferred to use an acid-type esterification catalyst which is a stronger acid than the monoester being esterified.

In order that the esterification product be uncomplicated by the presence of substantial amounts of alcoholysis products, it is preferred that the esterification not be carried to completion but terminated at or before 85% completion. It has been found to be practical to stop the esterification at such time as it has been from 50% to 85% completed. It may be stopped at lower levels of conversion. The lower limit will be determined by factors such as the ease of separation of the mixed ester from the other components of the esterification product and the amount of recycle that can be tolerated economically. The extent of esterification of the monoester can, of course, be followed by known expedients such as periodically measuring the amount of water formed and the acid number.

The second procedure for converting the monoester of a phthalic acid to a mixed ester involves reacting the monoester with an alkylene oxide at an elevated temperature in an aqueous medium in the presence of a small amount of a salt of the monoester, which salt is dissolved in the aqueous medium. The alkylene oxides which may be used are ethylene oxide; 1,2-propylene oxide; 1,2-butylene oxide, etc. The salt of the monoester may be added to the aqueous medium as such or it may be formed by interaction of a proportion of the monoester with a substance that forms a water-soluble salt therewith. Particular salts of the monoesters which may be used include the alkali metal salts, for example, sodium and potassium salts, ammonium salts, and amine salts, for example, those formed from pyridine and N:N-dimethylaniline. Substances which may be used to form salts in the reaction medium include hydroxides or alkaline-reacting salts of an alkali metal, for example, sodium hydroxide, potassium hydroxide, sodium borate, etc.; ammonia or ammonium salts, and amines such as pyridine and N:N-dimethylaniline. The amount of the salt of the monoester of a phthalic acid employed may be varied considerably. Good results have been obtained when there is used a proportion of salt which provides in the initial reaction mixture a ratio of cations to monoester of a phthalic acid (both as such and in the form of the salt) of between 1:5 and 1:2. The preferred temperature for this alkylene oxide addition reaction is within the range of 60° to 120° C.

By using the procedure described above I have prepared certain novel chemical compounds, an example of which is 2-hydroxyethyl methyl terephthalate. This mixed ester is prepared by oxidizing with elemental oxygen methyl p-toluate to obtain monomethyl terephthalate and then converting the monoester to 2-hydroxyethyl methyl terephthalate by esterification with ethylene glycol or reaction with ethylene oxide.

The compound, 2-hydroxyethyl methyl terephthalate, is representative of a class of new chemical compounds which can be prepared in accordance with this invention. In place of the ester of p-toluic acid and methyl alcohol the esters of p-toluic acid and an alkanol of from 1 to 4 carbon atoms may be employed as starting material. Similarly, the esters of m-toluic acid and an alkanol of from 1 to 4 carbon atoms may be employed. In place of ethylene glycol as the alcohol for esterifying the monoalkyl phthalate, there may be employed other glycols of the series HO(CH$_2$)$_n$OH, where $n$ is an integer of from 2 to 10. This new class of chemical compounds may be defined by the following general formulae:

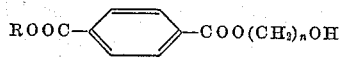

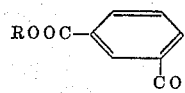

where R is an alkyl radical of from 1 to 4 carbon atoms and $n$ is an integer of from 2 to 10. Specific examples of these compounds are: 2-hydroxyethyl methyl terephthalate, 3-hydroxypropyl methyl terephthalate, 4-hydroxybutyl methyl terephthalate, 5-hydroxypentyl methyl terephthalate, 6-hydroxyhexyl methyl terephthalate, 7-hydroxyheptyl methyl terephthalate, 8-hydroxyoctyl methyl terephthalate, 9-hydroxynonyl methyl terephthalate, 10-hydroxydecyl methyl terephthalate, 2-hydroxyethyl ethyl terephthalate, 3-hydroxypropyl ethyl terephthalate, 4-hydroxybutyl ethyl terephthalate, 5-hydroxypentyl ethyl terephthalate, 6-hydroxyhexyl ethyl terephthalate, 7-hydroxyheptyl ethyl terephthalate, 8-hydroxyoctyl ethyl terephthalate, 9-hydroxynonyl ethyl terephthalate, 10-hydroxydecyl ethyl terephthalate, 2-hydroxyethyl propyl terephthalate, 2-hydroxyethyl butyl terephthalate, 2-hydroxyethyl methyl isophthalate, 3-hydroxypropyl methyl isophthalate, 4-hydroxybutyl methyl isophthalate, 5-hydroxypentyl methyl isophthalate, 6-hydroxyhexyl methyl isophthalate, 7-hydroxyheptyl methyl isophthalate, 8-hydroxyoctyl methyl isophthalate, 9-hydroxynonyl methyl isophthalate, 10-hydroxydecyl methyl isophthalate, 2-hydroxyethyl ethyl isophthalate, 3-hydroxypropyl ethyl isophthalate, 4-hydroxybutyl ethyl isophthalate, 5-hydroxypentyl ethyl isophthalate, 6-hydroxyhexyl ethyl isophthalate, 7-hydroxyheptyl ethyl isophthalate, 8-hydroxyoctyl ethyl isophthalate, 9-hydroxynonyl ethyl isophthalate, 10-hydroxydecyl ethyl isophthalate, 2-hydroxyethyl propyl isophthalate, and 2-hydroxyethyl butyl isophthalate.

The above-mentioned hydroxyalkyl alkyl terephthalates may be polymerized to fiber-forming polymers by heating at a temperature and pressure such as to ensure that the reaction mixture will be molten and that the alcohol formed from the alkyl group will be removed completely. The temperature should not be so high and/or the pressure so low that glycol formed from the hydroxyalkyl group will be removed from the system. The reaction is carried out preferably in the presence of an alcoholysis catalyst. Alcoholysis catalysts which may be employed are lithium, sodium, potassium, calcium, beryllium, magnesium, zinc, cadmium, aluminum, chromium, molybdenum, manganese, iron, cobalt, nickel, copper, silver, mercury, tin, lead, bismuth, antimony, platinum, and palladium. The ester interchange catalysts may be added in the form of powder, chips, shavings, ribbon, wire, or in any other convenient form. The alkali metals, the alkaline earth metals or magnesium are conveniently used in the form of alcoholates, formed by dissolving them in the glycol to be used or in another alcohol such as methyl or ethyl alcohol. Further, the alkali metals may be used in the form of their carbonates or other alkaline reacting salts such as the borates. The high polymers can be formed into filaments by extrusion or by drawing from melts of the high polymers. The resulting filaments can be cold-drawn.

The above-mentioned hydroxyalkyl alkyl isophthalates may be polymerized in a similar manner. The resulting polymers, however, are in general not fiber-forming. They do possess utility as film formers or as casting resins as do the polymers prepared from the hydroxyalkyl alkyl terephthalates.

Now, having indicated in a general way the nature and the purpose of this invention, the following examples are given to illustrate it. They are not, however, to be construed as limiting the invention. In the examples any percentages are by weight, unless otherwise indicated.

*Example 1*

Monomethyl terephthalate was prepared by oxidizing at 120° C. the methyl ester of p-toluic acid with air oxygen in the presence of a small amount of the cobalt salts of $C_6$ to $C_{10}$ fatty acids obtained in the oxidation of paraffins.

A 500 cc. three-necked flask was fitted with a sparge tube, a sealed glass stirrer, and a Friedricks condenser mounted over a Barrett-type moisture test receiver. 50 g. of monomethyl terephthalate, 172 g. ethylene glycol, and 0.5 g. of sodium bisulfate were charged into the reaction flask and the mixture was sparged with nitrogen. The temperature of the reaction mixture was then raised to 178° C. over a period of 35 minutes. The temperature of the mixture was then maintained at about 178° C. for 2.5 hours. Mechanical agitation and slow sparging with nitrogen were employed during the entire heating period. At the end of this period 5.3 cc. of water had been collected in the trap and the acid number had been reduced to 12.5 from an initial value of 70. The reaction mixture was cooled and mixed with 300 cc. of ethyl ether.

Two liquid phases were formed in this manner—a glycol phase and an ether phase. The ether phase was extracted exhaustively with 2% aqueous sodium hydroxide solution, an finally with water until neutral. It was then dried over anhydrous sodium sulfate and evaporated to dryness. The white residue resulting was crystallized three times from methanol to yield 7 g. of white crystals having a capillary melting point of 74° to 75.5° C. This crystalline product was 2-hydroxyethyl methyl terephthalate.

*Example 2*

Monomethyl terephthalate was prepared by the procedure of Example 1. The apparatus used for the esterification thereof was the same as that described in Example 1. 50 g. of monomethyl terephthalate, 172 g. of ethylene glycol, and 0.5 g. of sodium bisulfate were charged into the reaction flask. The mixture was stirred while a slow stream of nitrogen was passed through the sparge tube. After the system had been thoroughly flushed with nitrogen the contents of the flask were heated to 180° C. over a period of 28 minutes. The mixture was then heated for 3.5 hours at about 180° C. Mechanical agitation and slow sparging with nitrogen were employed during the entire heating period. By this time 4.2 cc. of water had been collected, and the acid number of the reaction mixture had been reduced to 14.1 from the initial value of 70.

The reaction mixture was treated as in Example 1 to recover the 2-hydroxyethyl methyl terephthalate therefrom, using ethyl ether as the extractant for the mixed ester. 11 g. of white crystals were obtained in this manner. After crystallizing twice from methanol the crystals were found to have a capillary melting point of 73.5° to 75.5° C. After a third crystallization from methanol the crystals melted at 74.5° to 75.5° C. The white crystalline product was analyzed with the following results:

|  | Found | Theory for 2-Hydroxyethyl Methyl Terephthalate |
| --- | --- | --- |
| Percent Carbon | 59.3 | 58.9 |
| Percent Hydrogen | 5.51 | 5.36 |
| Hydroxyl Value | 7.54 | 7.73 |
| Saponification Number | 499 | 508 |

It is clear from the above data that the white crystalline product is 2-hydroxyethyl methyl terephthalate.

The 2-hydroxyethyl methyl terephthalate so prepared may be polymerized to fiber-forming polymers by heating at a temperature and pressure such as to ensure that the reaction mixture will be molten and that the methanol formed from the methyl group will be removed completely. For example, a temperature of from 260° to 280° C. and atmospheric pressure may be employed. Lower pressure may be employed to assist in the removal of the methanol. The polymerization is preferably effected in the presence of an alcoholysis catalyst and in the absence of oxygen by blowing the polymerization mixture with an inert gas such as $N_2$.

As stated previously, the first step in the preparation of the mixed esters of this invention is the oxidation of an ester of a toluic acid to form a monoester of a phthalic acid. The alcohol radical of the toluic acid ester may be derived from any alcohol. Aliphatic alcohols may be used for the esterification of the toluic acids. Thus, methyl, ethyl, propyl, isopropyl, n-butyl, sec-butyl, n-amyl, n-hexyl, n-heptyl, n-octyl, etc., alcohols may be used. Methanol is particularly suitable. Not only aliphatic but also aromatic alcohols may be used for the esterification. Thus, benzyl alcohol and its homologs, tolyl alcohols, naphthyl alcohols, etc., may be used. Production of esters of the toluic acids with the aforesaid alcohols may be effected in known fashion. In the case of the esters of the toluic acids with aromatic alcohols, it is especially expedient to react alkali metal salts of the toluic acids with monochloromethyltoluene or bis-chloromethylbenzene, such as are obtained from the chlorination of xylene or the chloromethylation of benzene or toluene.

In the step of the process which involves esterification of the monoester of a phthalic acid, such as for example, monomethyl terephthalate, there can be used any of the methylene glycols of the series $HO(CH_2)_nOH$, where $n$ is an integer from 2 to 10, discussed previously in connection with the novel products of the invention. At least 100 mol per cent of the alcohol based on the monoester of a phthalic acid should be used, and preferably at least 400 mol per cent or more of the alcohol.

When an acid esterification catalyst is employed in the esterification of the monoester of a phthalic acid, any of the following may be used: sulfuric acid, hydrochloric acid, phosphoric acid, p-toluene sulfonic acid, benzene sulfonic acid, methionic acid, methane trisulfonic acid, perchloric acid, monosodium phosphate, disodium phosphate, sodium acid sulfate, monopotassium phosphate, dipotassium phosphate, potassium acid sulfate.

The examples have illustrated a preferred procedure for recovering the mixed ester from the esterification product. First, the product is extracted with a water-immiscible solvent for the mixed ester such as, for example, ethyl ether, trichloroethylene, chloroform, ethyl acetate, benzene, toluene, etc. The extract is then washed with aqueous alkali (1 to 10% concentration) to remove any acidic components, and finally washed with water until neutral. The mixed ester is then recovered by evaporation of the solvent, crystallization, or other means. The resulting mixed ester may be further purified, if desired, by crystallization from a suitable solvent. Methanol is a suitable solvent for purifying 2-hydroxyethyl methyl terephthalate. Still another procedure for recovering the mixed ester from the esterification product involves diluting the product with water, adding to the dilution product sufficient alkali to make it definitely alkaline and then extracting the alkaline dilution product with a water-immiscible solvent for the mixed ester. The mixed ester is then recovered from the solvent solution by evaporation of the solvent, crystallization, or other means.

What I claim and desire to protect by Letters Patent is:

1. A monomeric mixed ester of a phthalic acid selected from the group consisting of terephthalic acid and isophthalic acid wherein one of the carboxyl groups is esterified with an alkanol of from 1 to 4 carbon atoms and wherein the other carboxyl group is esterified with a glycol of the series $HO(CH_2)_nOH$ where $n$ is an integer of from 2 to 10.

2. A monomeric mixed ester of terephthalic acid wherein one of the carboxyl groups is esterified with an alkanol of from 1 to 4 carbon atoms and wherein the other carboxyl group is esterified with a glycol of the series $HO(CH_2)_nOH$ where $n$ is an integer of from 2 to 10.

3. A monomeric mixed ester of terepthalic acid wherein one of the carboxyl groups is esterified with methyl alcohol and wherein the other carboxyl group is esterified with a glycol of the series $HO(CH_2)_nOH$ where $n$ is an integer of from 2 to 10.

4. A monomeric mixed ester of terephthalic acid wherein one of the carboxyl groups is esterified with methyl alcohol and wherein the other carboxyl group is esterified with ethylene glycol.

References Cited in the file of this patent

UNITED STATES PATENTS

| 1,883,182 | Webel | Oct. 18, 1952 |
| 2,653,165 | Levine | Sept. 22, 1953 |
| 2,661,367 | Dazzi | Dec. 1, 1953 |

FOREIGN PATENTS

| 623,836 | Great Britain | May 4, 1949 |
| 63,987 | Netherlands | Aug. 15, 1949 |